(12) United States Patent  (10) Patent No.: US 8,251,455 B1
Midkiff et al.  (45) Date of Patent: Aug. 28, 2012

(54) MOUNTABLE FISHERMANS CHAIR

(76) Inventors: Thomas Midkiff, Destin, FL (US); John R. Tolbert, Sr., Lynn Haven, FL (US); John R. Tolbert, II, Lynn Haven, FL (US)

(*) Notice: Subject to any disclaimer, the term of this patent is extended or adjusted under 35 U.S.C. 154(b) by 260 days.

(21) Appl. No.: 12/548,944

(22) Filed: Aug. 27, 2009

Related U.S. Application Data

(63) Continuation-in-part of application No. 12/496,978, filed on Jul. 2, 2009.

(51) Int. Cl.
 A47B 97/00 (2006.01)
 A47B 83/00 (2006.01)
(52) U.S. Cl. ............... 297/463.1; 297/143; 297/217.1; 297/344.18; 296/64
(58) Field of Classification Search ............ 297/463.1, 297/463.2, 217.1, 217.7, 344.12, 344.18, 297/143; 296/64
 See application file for complete search history.

(56) References Cited

U.S. PATENT DOCUMENTS

| | | | |
|---|---|---|---|
| 2,333,734 A | 11/1943 | Nieltopp | |
| 3,469,810 A | 9/1969 | Dorris | |
| 4,129,198 A * | 12/1978 | Hunter | 182/187 |
| 4,676,547 A | 6/1987 | Spillman | |
| 4,709,649 A * | 12/1987 | Wann | 297/344.18 X |
| 5,188,424 A | 2/1993 | Herron | |
| 5,673,968 A * | 10/1997 | Ponzio | 297/143 |
| 6,062,638 A | 5/2000 | Ferguson | |
| 6,203,103 B1 | 3/2001 | Presson | |
| 6,808,231 B1 * | 10/2004 | Hill | 297/217.7 |
| 6,932,021 B1 | 8/2005 | Martini | |
| 7,073,857 B1 * | 7/2006 | Bailey | 297/217.7 |
| 7,396,083 B2 | 7/2008 | Kasner | |
| 2008/0106130 A1 * | 5/2008 | Carpenter | 297/217.7 X |

* cited by examiner

*Primary Examiner* — Anthony D Barfield
(74) *Attorney, Agent, or Firm* — Garvey, Smith, Nehrbass & North, L.L.C.; Gregory C. Smith; Julia M. FitzPatrick

(57) ABSTRACT

A fishing chair mountable on a pier railing or truck tailgate, which includes a frame, for supporting a chair seat; a first arm member extending from the frame to a point above the seat; a pair of finger members extending from the first arm member for engaging over and around a pier railing or truck tailgate; a second arm member extending from the frame for resting against a face of a wall of the pier or tailgate for allowing the chair to cantilever out from the pier wall or tailgate without making contact with the ground below; and a leg extending downward from the frame and having a pair of wheels so that the fishing chair can be rolled onto and away from the mounting position. There is further included a rod holder mounted on the first arm member. In this embodiment the seat is positioned to have a user face the pier railing when the chair is mounted thereupon; and the seat is positioned to have a user face away from the truck tailgate when the chair is mounted thereupon. There are other embodiments depicted in the body of the patent.

13 Claims, 7 Drawing Sheets

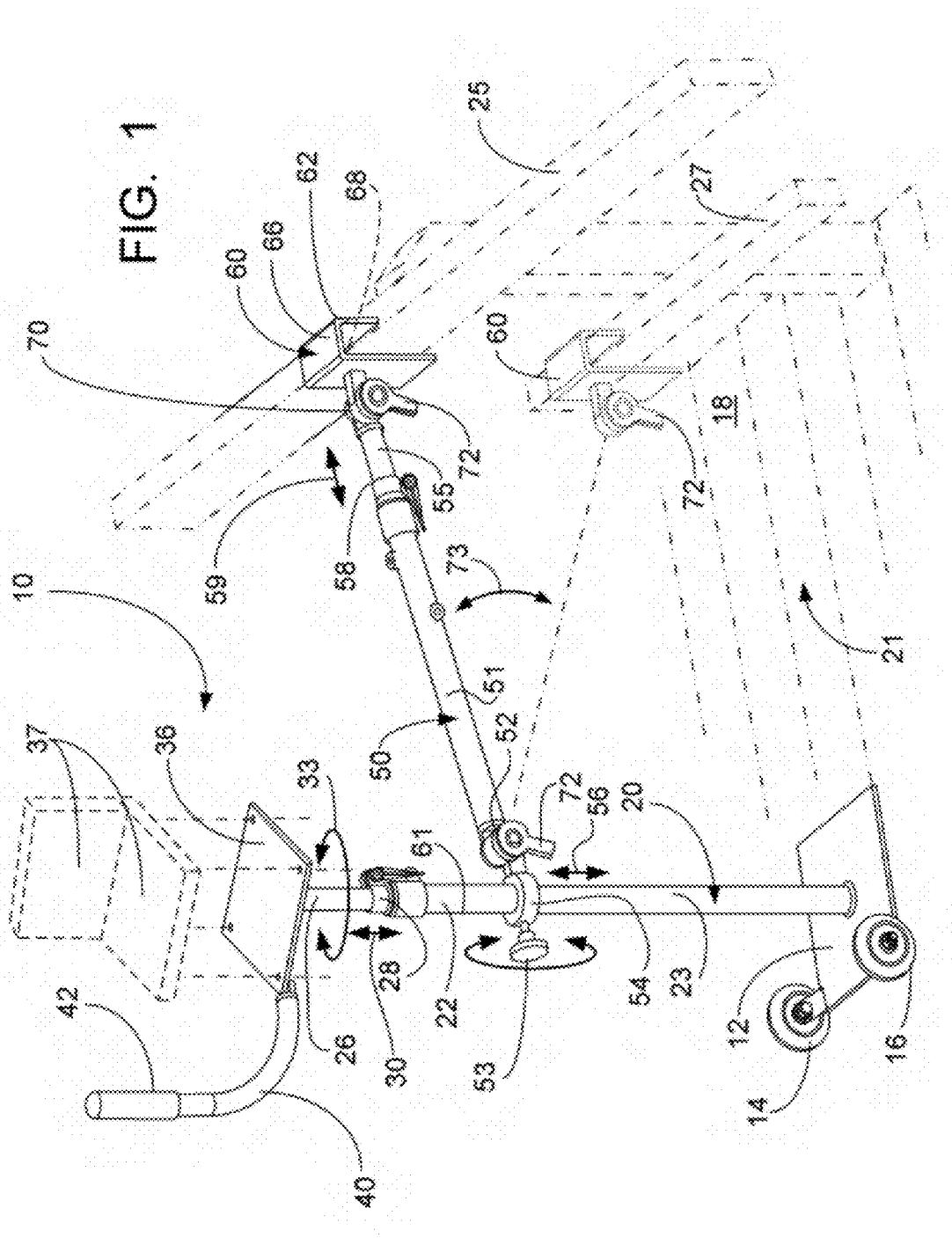

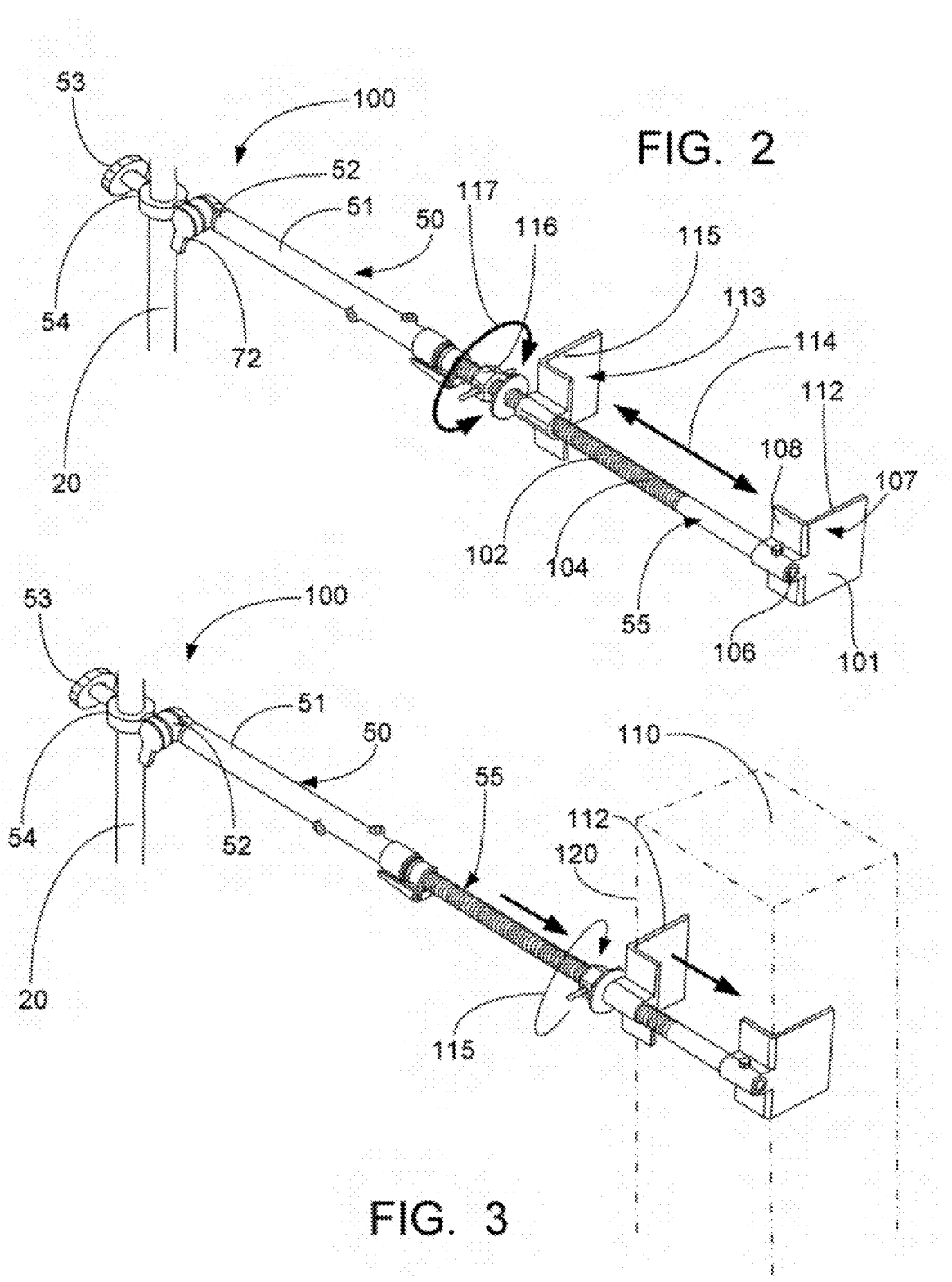

MOUNTABLE FISHERMANS CHAIR

CROSS-REFERENCE TO RELATED APPLICATIONS

This is a continuation-in-part of co-pending U.S. patent application Ser. No. 12/496,978, filed Jul. 2, 2009, which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fishing devices. More particularly, the present invention relates to a chair apparatus which can be rolled onto a pier or boat, and is capable of being secured to a pier railing or boat gunnel, and is height adjustable, so that a fisherman is able to sit on the seat portion of the device and be at a level above the height of the pier railing or boat wall to conduct fishing operations. In a second embodiment, the chair is capable of being hung or suspended from a pier railing or the tailgate of a truck without the need for ground support.

2. General Background of the Invention

In the art of fishing, one of the most common type of fishing is done off of a pier, of the type which usually includes railings on each side so as to prevent entry into the water. The problem which is encountered is that the railings are usually at least three or four feet high, which makes it very difficult for a person to be seated, for example, in a lawn chair which requires one to cast above one's head in order to cast over the rail into the water. This is very uncomfortable and does not lend itself to ease in fishing from a pier. Likewise, even when one is fishing from a boat, oftentimes, the boat wall reaches a height above where one may be seated in the boat, and the same problem is encountered. Therefore, there is a need for a device to overcome this awkward condition when fishing in such circumstances.

The following U.S. Patents are incorporated herein by reference:

TABLE

| Pat. No. | TITLE | ISSUE DATE |
| --- | --- | --- |
| 2,333,734 | Collapsible Seat | Nov. 9, 1943 |
| 3,469,810 | Beam Clamp | Sep. 30, 1969 |
| 4,767,547 | Portable Spectator's Stool | Jun. 30, 1987 |
| 5,188,424 | Portable Seat | Feb. 23, 1993 |
| 6,062,638 | Portable Stool | May 16, 2000 |
| 6,203,103 | Collapsible Fishing Chair with Detachable Floats | Mar. 20, 2001 |
| 6,932,021 | Dock Swivel Step | Aug. 23, 2005 |
| 7,396,083 | Single-legged Body Support System | Jul. 8, 2008 |

BRIEF SUMMARY OF THE INVENTION

The apparatus of the present invention solves the problems in the art in a simple and straightforward manner. What is provided is a device for being secured onto a rail of a pier to allow a fisherman to be seated on the device at a height so that he is able to cast easily above the rail. The device includes a flat base which rests on the pier floor, a pair of wheels secured to the base to all the device to be rolled into position; an upright vertical post, having a first lower portion extending upward from the base and a second upper portion which telescopes out from the end of the first lower portion to a predetermined height, the upper portion terminating in a flat surface upon which a cushion or other seat can be placed; a handle member secured to the upper flat surface in order to roll the device into position; a second post member extending substantially horizontally outward from the lower section of the vertical post, which is height adjustable on a first end secured to the vertical post, and extends outward to a second portion which telescopes out from the first portion so that the device can be positioned a predetermined distance from the pier railing; a clamp on the distal end of the second portion for securing to a portion of the pier rail so that the device is maintained upright while the fisherman is seated thereupon.

In a second principal embodiment there is provided the fishing chair mountable on a pier railing or truck tailgate, which includes a frame, for supporting a chair seat; a first arm member extending from the frame to a point above the seat; a pair of finger members extending from the first arm member for engaging over and around a pier railing or truck tailgate; a second arm member extending from the frame for resting against a face of a wall of the pier or tailgate for allowing the chair to cantilever out from the pier wall or tailgate without making contact with the ground below; and a leg extending downward from the frame and having a pair of wheels so that the fishing chair can be rolled onto and away from the mounting position. There is further included a rod holder mounted on the first arm member. In this embodiment the seat is positioned to have a user face the pier railing when the chair is mounted thereupon; and the seat is positioned to have a user face away from the truck tailgate when the chair is mounted thereupon.

Therefore, it is a principal object of the present invention to provide a fisherman's chair which is able to be height adjustable, and rest on the floor of the pier and engaged to a pier railing for support, while a fisherman is seated on the device.

It is a further principal object of the present invention to provide a fisherman's chair which is able to rolled into position on a pier, a seat portion secured to the end of a vertical post, capable of being adjusted to a certain height, an arm extending outward from the vertical post, and adjustable to allow the device to be a predetermined distance from the pier railing when a fisherman is seated and casting from the device.

It is a further principal object of the present invention to provide a fishermans' chair which can be rolled into position on a beach, and the vertical post has a sharp lower end which could be driven into the sand a sufficient depth to support the chair upright when a fisherman is seated and casting from the device.

It is a further principal object of the present invention to provide a fisherman's chair which can be rolled into position onto a pier or to a truck, the chair having the ability to be suspended from the pier railing or truck tailgate, so that a user is cantilevered out from the pier or truck tailgate, and the chair is not making contact with the surface below.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 illustrates an overall view of the preferred embodiment of fisherman's chair device capable of being secured to a railing of a fishing pier;

FIGS. 2 and 3 illustrate isolated views of the preferred embodiment of the fisherman's chair device capable of being secured to a beam of a bridge;

DETAILED DESCRIPTION OF THE INVENTION

Figure 4:
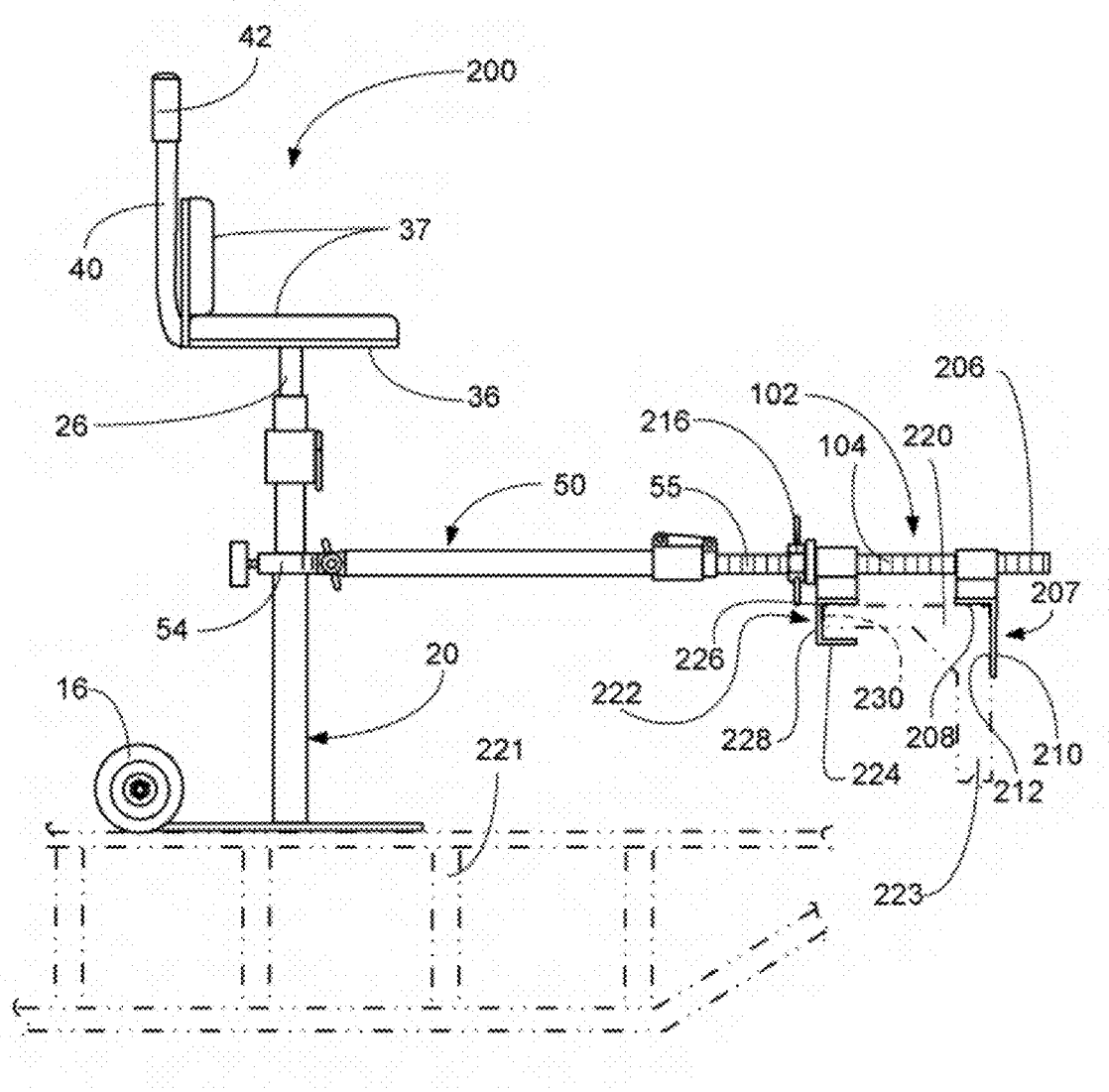
FIG. 4 illustrates a side view of the preferred embodiment of the fisherman's chair device capable of being secured to a wall or gunnel of a boat.

FIGS. 1 through 5 illustrate the first preferred embodiment of the fisherman's chair device of the present invention by the numeral 10. As seen in overall view in FIG. 1, the chair device 10 includes a flat, substantially rectangular base member 12, having a pair of wheels 14, 16 which rotate freely and allow the chair device 10 to be wheeled into position onto the floor surface 18 of a pier 21 (FIG. 1), or bridge beam 110 (FIGS. 2 and 3) or boat 121 (FIG. 4), as the case may be. As seen in FIG. 1, once in position, the lower surface 19 of the base member 12 rests on the floor surface 18 of pier 21. There is further illustrated a vertical post 20, having a first lower portion 22, the lower end 24 of which is permanently secured through welding or the like, to the base member 12. Vertical post 20 has a second upper portion 26 which has the ability to telescope in and out from the distal end 28 of vertical post 20, as seen by Arrow 30 in FIG. 1, to a predetermined height. Once the height is achieved, there is provided a clamp 32 which when tightened secures the upper portion 26 in the position within lower portion 22 until the clamp 32 is disengaged. Further, when clamp 32 is disengaged, the upper portion 26 of post 20 may rotate to any position in a 360 degree direction as seen by Arrow 33 in FIG. 1. Clamp 32 would be engaged when the seat is at the proper height and direction.

As seen further, the upper end 24 of upper portion 26 of vertical post 20 there is engaged a flat, substantially rectangular seat base 36, having an upper surface 38 upon which may be set a seat or cushion member 37, as the fisherman so desires, for greater comfort. Further, there is provided a handle member 40 which extends outward and upward from seat base 36, terminating in a grip 42, so that the handle 40 can be used to guide the device 10 as it is rolled into position for fishing.

Turning now to another feature of the device, again reference is made to FIG. 1, wherein there is shown an arm member 50, having a first portion 51 extending substantially horizontally from and engaged to the lower portion 22 of vertical post 20. Arm member 50 has a second portion 55 which telescopes in and out of the distal end 58 of first portion 51, as seen by Arrow 59 to a desired distance as will be explained. The first end 52 of arm member 50 includes a circular clamp 54 engaged around the circular wall 23 of lower portion 22.

The clamp member is of the type having a knob 53 which can be engaged and disengaged against the wall 23 during use. This feature allows the arm member 50 to be moved to any point along the wall 23 of lower portion 22, in the direction of Arrow 56, so that when the desired height is achieved, the knob 53 is tightened against the wall 23 of lower portion 22 to maintain the arm member 50 at the desired height. It should be noted that the wall 23 of lower portion 22 of post 20 may include a plurality of protruding teeth 60 so that when the knob 53 is engaged, it would be engaged in a space defined by the teeth, so as to assure the arm member 50 maintains secure and in place. Likewise, the first end 52 of arm member 50 includes a swivel 70 and thumb screw member 72 at the connection of the circular clamp 54 to the first end 52 of the arm member 50, which allows the arm member 50 to pivot up and down, as needed, in the direction of Arrow 73, so that one may fix the arm to an upper beam railing 25 or a lower beam railing 27, when the clamp is in the proper position, the screw 72 is tightened to maintain the arm member 50 in the desired position.

Turning now to the second portion 55 which telescopes out from the distal end 58 of the first portion 51 of arm member 50, there is provided a clamp 60, which as seen in FIG. 1, has a pair of wall portions 62 and 64, secured to a top portion 66, and spaced apart to define an opening 68 therebetween. In use, once the user determines the distance the device 10 is to be set from the upper or lower rail s 25, 27 of the pier 21, the clamp 60 is engaged around the top or side of the rail and set in place. As with the first end 52 of arm member 50, the distal end 58 likewise includes a swivel 70 thumb screw member 72 at the connection of the end 58 to the clamp 60, which allows the clamp 60 to be inclined or declined as needed, in the direction of Arrow 73, so that when the clamp is in the proper position, the screw 72 is tightened to maintain the clamp 60 in the desired position.

FIGS. 2 and 3 illustrate another preferred embodiment of the fisherman chair device 100 of the present invention. This embodiment of the device would be designed to be secured to the rail or beam 110 of a bridge, as illustrated. For sake of avoiding repetition, all of the features of the second embodiment of device 100 are identical to the features of the device 10 as explained in reference to FIG. 1, except for the features that will be more fully explained below.

In FIGS. 2 and 3, fisherman chair device 100 is modified from device 10 shown in FIG. 1, in terms of how it relates to the manner in which this device 100 is secured to a railing or beam 110 of a bridge. The horizontal arm 50 has been modified in that the second portion 55 of arm 50 telescopes out from first portion 52, but, second portion 55 includes a threaded wall portion 102 having a continuous thread 104 extending along a substantial portion of its length. At the distal end 106 of portion 102 there is provided a plate 107, shaped in an "L" configuration having a first portion 108 engaged to the end 106 of portion 102, and a face portion 111 secured to and at a right angle from first portion 108, defining an inner face 112 which will engage against a beam 110 of a bridge. There is a second "L" shaped plate 113 slidably moveable along the threaded portion 102 of second portion 55, which allows it to be slid in and out along portion 102, in the direction of Arrow 117, and held in position by the threading of nut 116 on thread 104. Plate 113 is configured identical to plate 107 and also defines a face 115 which engages against an opposing wall 120 of beam 110. When the plates are set against beam 110, the nut 116 is tightened into position (Arrow 117) against plate 113, and the arm 50 is secured in place, which, of course, secures the device 100 into position.

Turning now to another embodiment shown in FIG. 4, fisherman chair device 200 is modified from device 100 shown in FIG. 2, very slightly, to allow it to be secured to the wall or gunnel 220 of a boat 221. As was stated earlier in regard to the embodiment in FIGS. 2 and 3, the horizontal arm 50 has been modified in that the second portion 55 of arm 50 telescopes out from first portion 52, but, second portion 55 includes a threaded wall portion 102 having a continuous thread 104 extending along a substantial portion of its length. At the distal end 106 of portion 55 there is provided a plate 207, shaped in an "L" configuration having a first portion 208 engaged to the end 206 of portion 55, and a face portion 210 secured to and at a right angle from first portion 208, defining an inner face 212 which will engage against the wall 223 of the boat. In the embodiment shown in FIG. 4, the second member could be defined as a clamp 222 and is shaped similar to the clamp 60 described in regard to FIG. 1. That is, clamp 222, which is similar, if not identical to clamp 60 seen in FIG. 1, includes a pair of wall portions 224 and 226, secured to a top portion 228, and spaced apart to define an opening 230 therebetween. Therefore, when plate 207 is set against the wall 223 of a boat 221, the nut 216, on threaded portion 102 is tightened into position against clamp 222, which in turn engages the gunnel 220 of the wall 223 of the boat 221, and the arm 50 is secured in place, which, of course, secures the device 200 into position.

Figure 5:
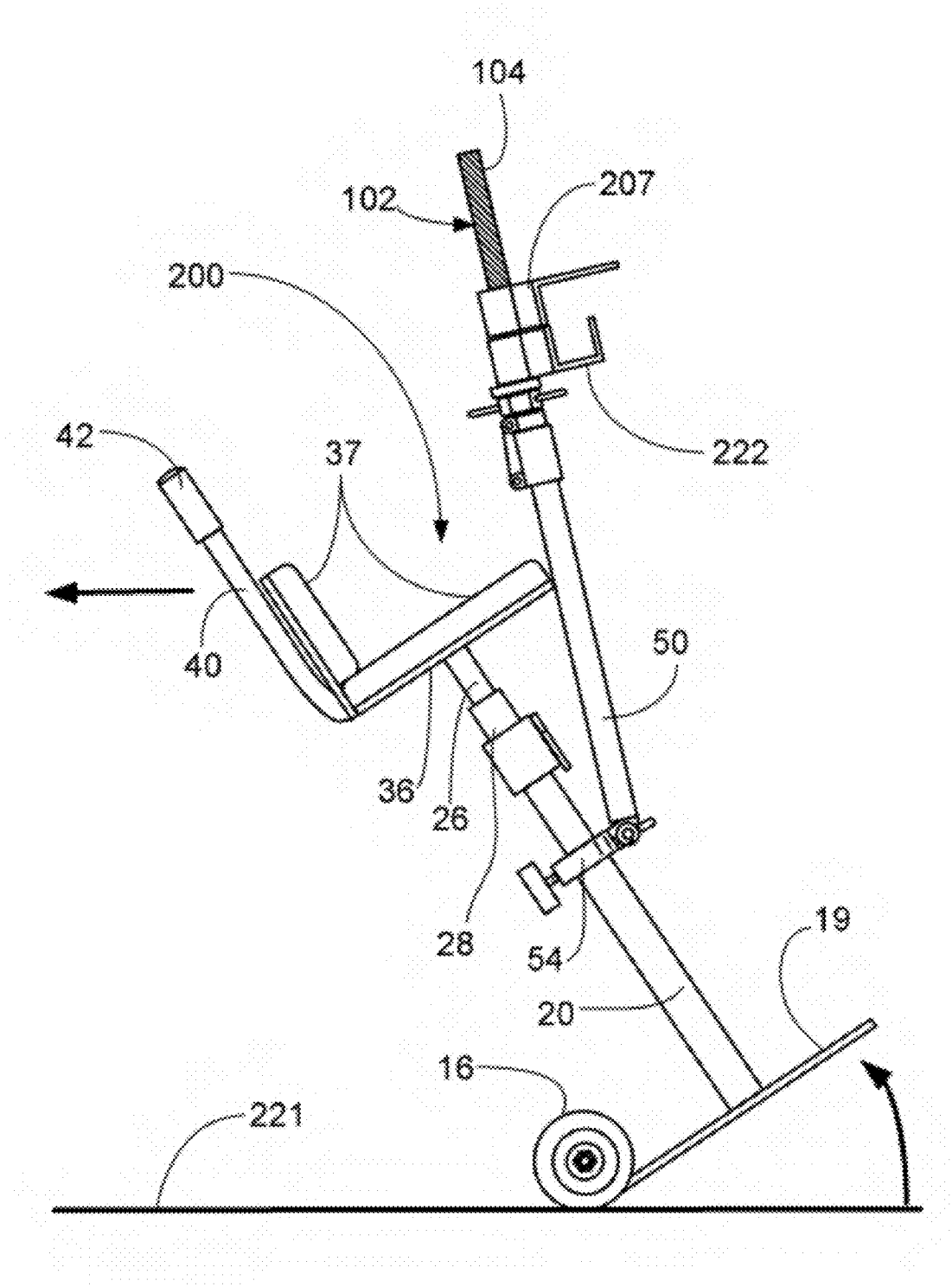
FIG. 5 illustrates a side view of the preferred embodiment of the fisherman's chair device as it would be rolled onto or off of the fishing location.

In FIG. 5, the device 10 is illustrated in the embodiment which would be set upon a boat 221. Of course, the movement of the device in any of the embodiments would be in the same manner as will be explained below. As seen the device 10 or 100 or 200 would be tilted back by the use of handle member 40, so that it could be rolled on wheels 14, 16. As seen, during transport, the arm member 50 has been secured in its highest position, so that the device 10 can be more easily maneuvered than if the arm 50 were extended outward. Once it is moved into place, the arm 50 would be lowered to the desired height and distance from vertical post 20, and as explained in regard to the three embodiments, the clamps would be tightened so that the device is secured in place for the fisherman.

It is foreseen that the device as disclosed above could be modified so that the base 12 could be removed, and the lower end of post 20 would be sharp and pointed so that the device or chair could be rolled out onto a beach and the point end could be set into the sand a sufficient depth to allow the chair to remain upright and support a fisherman thereupon.

In each of the embodiments discussed in FIGS. 1 through 5, it is foreseen that there is an alternative embodiment in which the device is attached to a pier or a beam of a bridge or to the gunnel of a boat, or any other structure. The device could be altered to allow the end of the arm 50 extending out from the vertical post 20 so that there is a pair straps, having industrial strength hook and fasteners, of the type material registered as Velcro®, a trademark owned by Velcro Industries. The straps would simply extend outward from the end of the arm 50 and have sufficient length to be wrapped around the pier or beam or other structure to hold the chair secured to the structure, without the use of the types of clamps described and shown.

Figure 6:
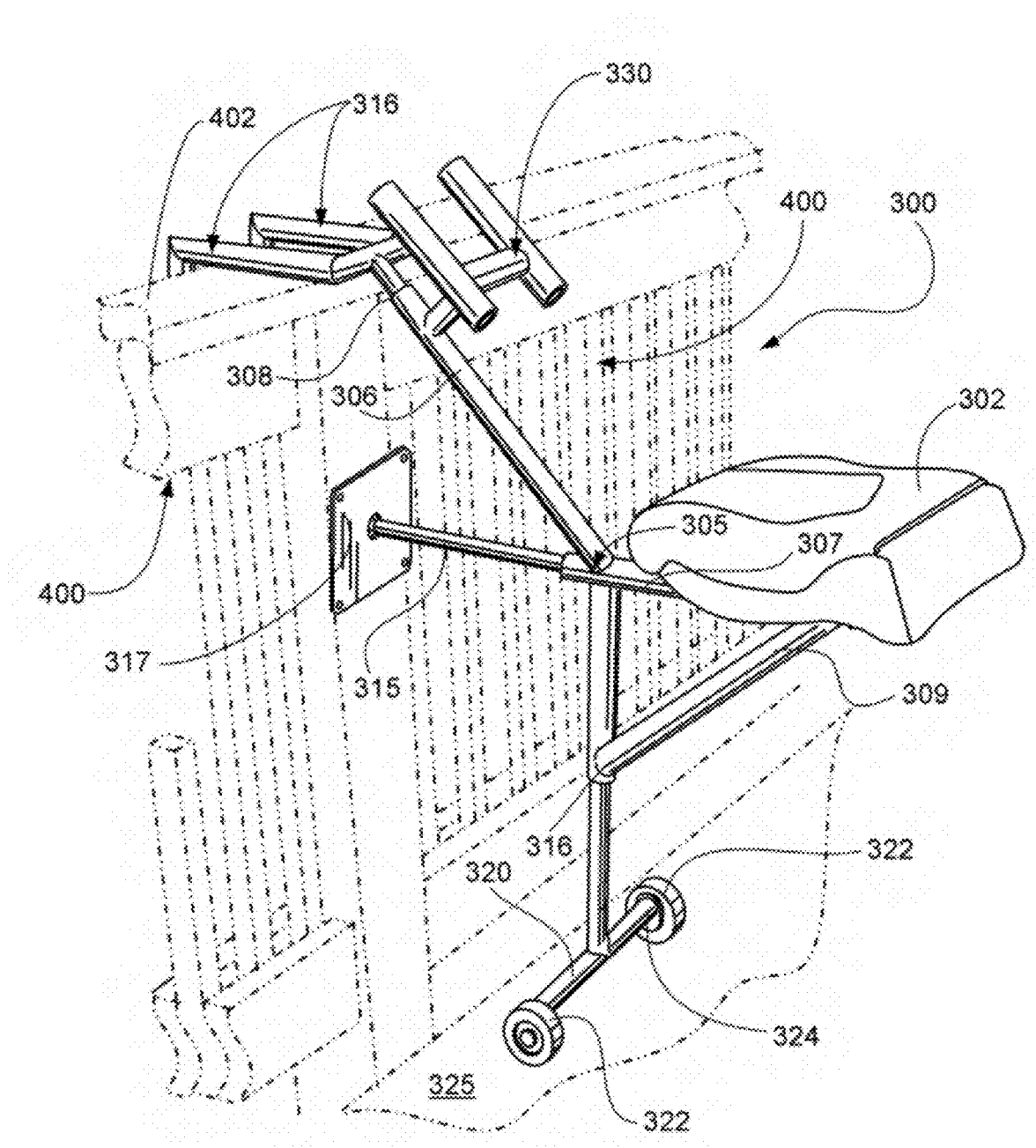
FIG. 6 illustrates an overall perspective view of second preferred embodiment of a fisherman's chair of the present invention suspended from a pier railing.
Figure 7:
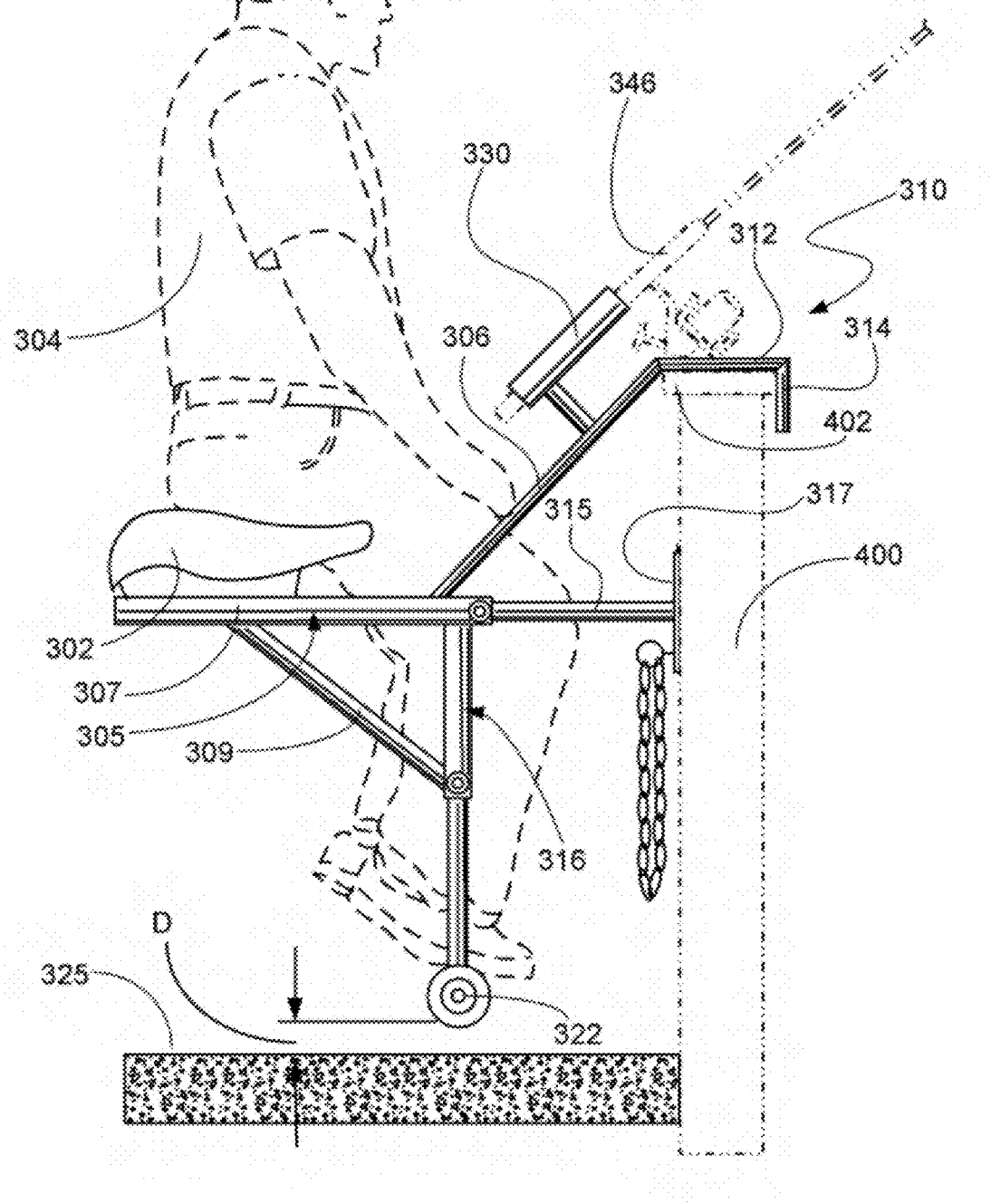
FIG. 7 illustrates a side view of second preferred embodiment of a fisherman's chair of the present invention suspended from a pier railing.

FIGS. 6 through 9 illustrate additional preferred embodiments of the present invention by the numeral 300. First, reference is made to FIGS. 6 and 7 which illustrate fishing chair 300 mounted to a pier railing 400. Chair 300 includes a padded seat 302 upon which a user 304 of the chair 300 would be seated when used, as seen in phantom view in FIG. 7. In FIGS. 6 and 7, chair 300 includes a frame 305 upon which the seat 302 is secured. Frame 305 includes a horizontal portion 307 and a bracket portion 309 upon which seat 302 is secured. There is provided a first arm 306 extending from the frame 305 at an angle, so that the distal end 308 of the arm 306 terminates at a point above the seat 302 at essentially at the level of the cap portion 402 of pier railing 400. At the distal end 308 of arm 306 there is provided a pair of fingers 310, which, as seen in side view in FIG. 7, include a first horizontal portion 312 extending over the top of cap 402 of railing 400, and a second portion 314 extending vertically from the end of horizontal portion 312, so that the fingers 310 are secured over and around cap 402 of railing 400.

In order to allow the chair 300 to be positioned upright which arm 306 is engaged around cap 402, there is provided a second horizontal arm 315 extending horizontally out from frame 305, and terminating at a flat metal plate 317, to a predetermined distance, so that when the arm 306 is secured over cap 402, and plate 317 is engaged against the railing 400, the chair is upright, and the seat is horizontal so the user 304 is seated upright, as seen in FIG. 7. As illustrated further, there is provided a leg 316 extending downward from frame 305 and terminates in a cross member 320 which has a wheel 322 mounted on each end 324 of the cross member 320, so that during use, as seen in FIG. 7, the wheels do no make contact with a surface 325 below, but the cross member 320 can be used as a foot rest for the user 304. However, when the chair 300 is not in use, the fingers 310 are disengaged from the cap 402, and the chair 300 is lowered and may be rolled away or to a second location.

Finally, for the user 304 there is provided a pair of rod holders 330 mounted near the distal end 308 of the arm 306, of the type known in the art into which the handle of a fishing rod 346 may be inserted to maintain the rod in position for fishing rather than the user 304 continue to support the rod during fishing.

Figure 8:
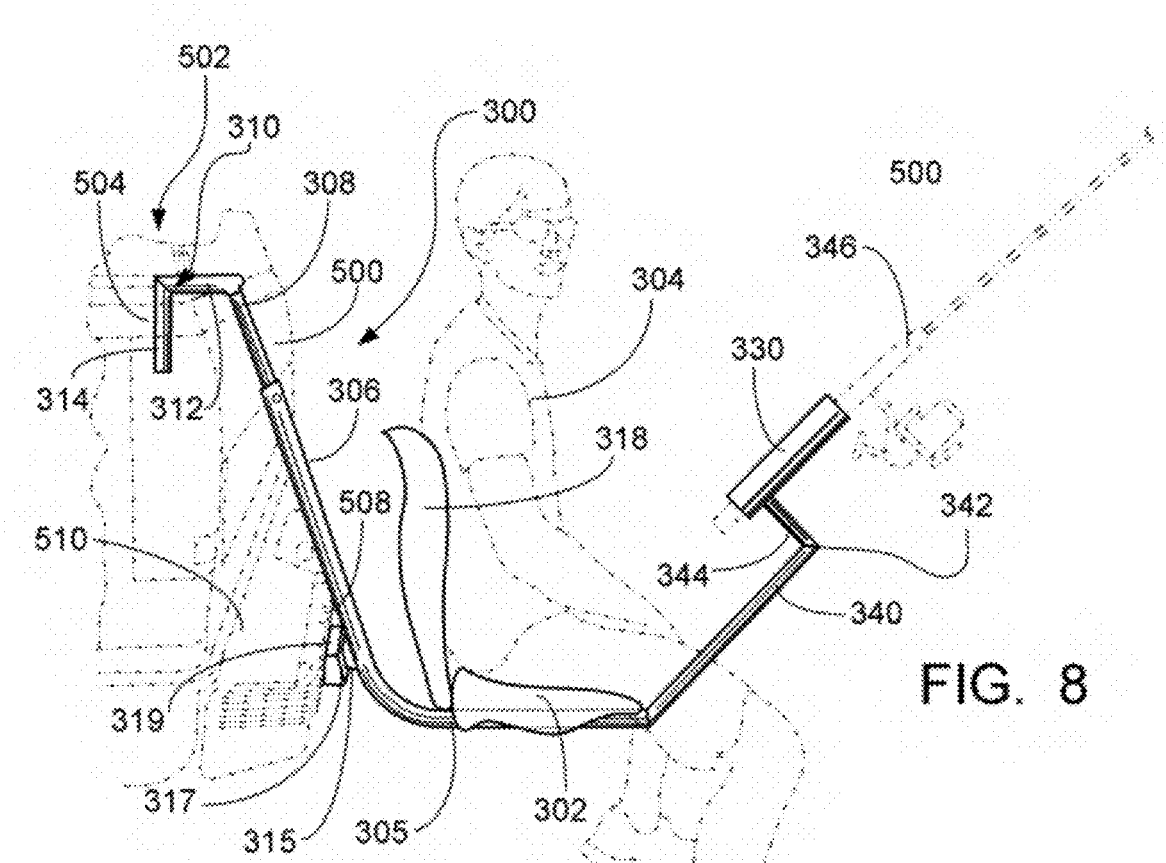
FIGS. 8 and 9 illustrate side views of the fisherman's chair suspended from the tailgate of a truck.
Figure 9:
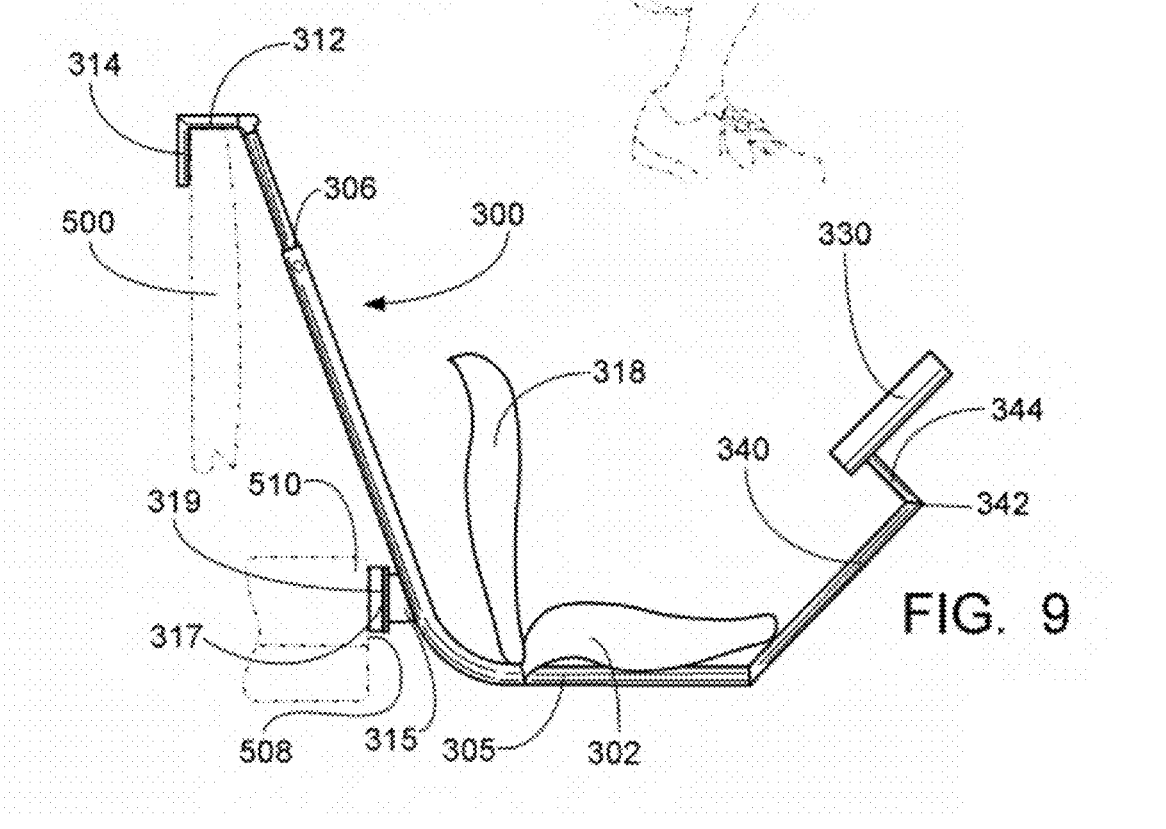

Turning now to an embodiment of the chair 300 which is used mounted to a vertical wall, such as a tailgate 500 of a truck 502. As seen in FIGS. 8 and 9, the embodiment in these figures also include a seat 302 mounted on a seat frame 305. As with the chair 300 in FIGS. 6 and 7, in this embodiment, there is a first arm 306 extending from the frame 305 at an angle, so that the distal end 308 of the arm 306 terminates at a point above the seat 302 at essentially at the level of the top edge 504 of truck tailgate 500. At the distal end 308 of arm 306 there is provided a pair of fingers 310, which, as seen in side view include a first horizontal portion 312 extending over the top edge 504 of tailgate 500, and a second portion 314 extending vertically from the end of horizontal portion 312, so that the fingers 310 are secured over and around tailgate 500 of truck 502.

As with the chair 300 illustrated in FIGS. 6 and 7, in order to allow the chair 300 to be positioned upright while arm 306 is engaged around tailgate 500, there is provided a second horizontal truncated arm 315 extending horizontally out from frame 305, and terminating at a flat metal plate 317, to a predetermined distance, plate 317 having a rubber bumper 319 mounted thereupon, which makes contact with the face 508 of tailgate 500, and will not damage the tailgate surface. Therefore, when the arm 306 is secured over tailgate 500, and the rubber bumper 315 mounted on plate 314 is engaged against the face 508 of truck bumper 510, the chair 300 sits upright, and the seat 302 is horizontal so the user 304 is seated upright, as seen in FIG. 8. There is also provided a back rest portion 318 mounted on the frame 305 for greater comfort for the user 304.

Also, as seen in FIGS. 8 and 9, because the user 304 is seated away from the arm member 306, unlike the embodiment discussed in FIGS. 6 and 7, the rod holders 330 cannot be mounted on arm 306. Therefore, there is provided a second arm 340 which extends outward and angulated up from frame 305 in the direction the user 304 is facing. The arm terminates at point 342 where there is provided a mounting member 344 upon which one or more rodholders 330 would be mounted, securing a fishing rod 346 in place within the rodholder 330.

It should be noted that there are differences in the two embodiments of the cantilevered chairs shown in FIGS. 6 and 7, and the chair shown in FIGS. 8 and 9. First, the seat in the chair 300 shown in FIGS. 6 and 7 is positioned so that the user 304 is facing the first arm 306 and is facing the pier rail 400 upon which the chair 300 is mounted, so that the user 304 can see and fish above the rail 400. In the embodiment shown in 8 and 9, the seat 302 is positioned so that the user faces away from the arm 306, and away from the tailgate 500, so that the user 304 can face the water into which he is fishing. Also the embodiment in FIGS. 8 and 9 does not include wheels as are illustrated in FIGS. 6 and 7. Although not shown, the embodiment depicted in FIGS. 6 and 7 could include a back rest portion 318 mounted onto frame 305 for the comfort of the user.

The following is a list of parts and materials suitable for use in the present invention.

PARTS LIST

| Part Number | Description |
| --- | --- |
| 10 | chair device |
| 12 | rectangular base member |
| 14, 16 | wheels |
| 18 | floor surface |
| 19 | lower surface |
| 20 | vertical post |
| 21 | pier |
| 22 | lower portion |
| 23 | circular wall |
| 24 | lower end |
| 25 | upper pier railing |
| 26 | second upper portion |
| 27 | lower pier railing |
| 28 | distal end |
| 30 | Arrow |
| 32 | clamp |
| 33 | Arrow |
| 36 | rectangular seat base |
| 37 | seat cushion |
| 38 | upper surface |
| 40 | handle member |
| 42 | grip |
| 50 | arm member |
| 51 | first portion |
| 52 | first end |
| 53 | knob |
| 54 | circular clamp |
| 55 | second portion |
| 56 | Arrow |
| 58 | distal end |
| 59 | Arrow |
| 60 | clamp |
| 61 | teeth |
| 62, 64 | wall portions |
| 66 | top portion |
| 68 | opening |
| 70 | swivel |
| 72 | thumb screw |
| 73 | Arrow |
| 100 | chair device |
| 102 | threaded wall portion |
| 104 | continuous end |
| 106 | distal end |
| 107 | plate |
| 108 | first portion |
| 110 | bridge beam |
| 110 | face portion |
| 112 | inner face |

PARTS LIST -continued

| Part Number | Description |
| --- | --- |
| 113 | L shaped plate |
| 114 | Arrow |
| 115 | face |
| 116 | nut |
| 117 | Arrow |
| 120 | opposing wall |
| 122 | clamp |
| 200 | chair device |
| 206 | end |
| 207 | plate |
| 208 | first portion |
| 210 | face portion |
| 212 | inner face |
| 216 | nut |
| 220 | gunnel |
| 221 | boat |
| 222 | clamp |
| 223 | wall |
| 224, 226 | wall portions |
| 228 | top portion |
| 230 | opening |
| 300 | fishing chair |
| 302 | seat |
| 304 | user |
| 305 | frame |
| 306 | first arm |
| 307 | horizontal portion |
| 308 | distal end |
| 309 | bracket |
| 310 | fingers |
| 312 | horizontal portion |
| 314 | second portion |
| 315 | second horizontal arm |
| 317 | flat plate |
| 316 | leg |
| 318 | seat back |
| 319 | rubber bumper |
| 320 | cross member |
| 322 | wheels |
| 324 | end |
| 325 | surface |
| 330 | rod holders |
| 340 | second arm |
| 342 | point |
| 344 | mounting member |
| 346 | fishing rod |
| 400 | pier railing |
| 402 | pier cap |
| 500 | tailgate |
| 502 | truck |
| 504 | top edge |
| 508 | bumper face |
| 510 | truck bumper |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A fishing chair mountable on a pier railing or truck tailgate, comprising:
   a. a frame, for supporting a chair seat on its upper end;
   b. a first arm member extending from the frame to a point above the seat;
   c. finger members extending from the first arm member for engaging over and around an upright railing;
   d. a second arm member extending from the frame for resting against a face of a vertical portion of the upright railing for allowing the chair to cantilever out from the upright railing; without making contact with the ground below.

2. The fishing chair in claim 1, wherein the upright railing comprises a railing of a fishing pier.

3. The fishing chair in claim 1, wherein the upright railing comprises a tailgate of a truck.

4. The fishing chair in claim 1, further comprising a leg extending downward from the frame and having a pair of wheels mounted on the lower end of the leg so that the fishing chair can be rolled onto and away from the mounting position.

5. The fishing chair in claim 1, further comprising a rod holder mounted on the first arm member.

6. The fishing chair in claim 1, wherein the mounted wheels provide a resting place for the user of the chair to rest ones feet.

7. The fishing chair in claim 1, wherein the seat is positioned to have a user face the upright railing when the chair is mounted thereupon.

8. The fishing chair in claim 1, wherein the seat is positioned to have a user face away from the upright railing when the chair is mounted thereupon.

9. The fishing chair in claim 1, further comprising a flat plate secured to a distal end of the second arm to be supported against the railing.

10. The fishing chair in claim 1, further comprising a rubber bumper secured to a distal end of the second arm to be supported against the railing.

11. The fishing chair in claim 1, wherein there is further provided rodholders mounted on the first arm.

12. A fishing chair mountable on a fishing pier railing, comprising:
   a. a frame, for supporting a chair seat on an upper end of the frame;
   b. a first arm member extending from the frame to a point above the seat;
   c. one or more finger members extending from the first arm member for engaging over and around the pier railing;
   d. a second arm member extending from the frame for resting against a face of a vertically inclined portion of the pier railing for allowing the chair to cantilever out from the pier railing without making contact with the ground below.

13. A fishing chair mountable on an upright truck tailgate, comprising:
   a. a frame, for supporting a chair seat positioned so a user faces away from the upright tailgate;
   b. a first arm member extending from the frame to a top edge of the upright tailgate;
   c. one or more finger members extending from the first arm member for engaging over and around the upright tailgate;
   d. a second arm member extending from the frame for resting against a face of the upright tailgate for allowing the chair to cantilever out from the upright tailgate without making contact with the ground below; and
   e. a third arm extending upward from the frame, in a direction in which a user is seated, for supporting at least one rodholder thereupon.

\* \* \* \* \*